(12) United States Patent
Baucke et al.

(10) Patent No.: US 11,814,297 B2
(45) Date of Patent: *Nov. 14, 2023

(54) METHOD FOR PRODUCING POTASSIUM CHLORIDE GRANULAR MATERIAL

(71) Applicant: K+S Aktiengesellschaft, Kassel (DE)

(72) Inventors: Guido Baucke, Schenklengsfeld OT Wippershain (DE); Armin Dietrich, Weissenborn (DE); Stefan Dressel, Kassel (DE); Sebastian Kopf, Bad Salzungen (DE); Paul Meissner, Magdeburg (DE); Wolfgang Walczyk, Heringen OT Herfa (DE); Ludger Waldmann, Telgte (DE)

(73) Assignee: K+S Aktiengesellschaft, Kassel (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/330,240

(22) PCT Filed: Aug. 22, 2017

(86) PCT No.: PCT/DE2017/000259
§ 371 (c)(1),
(2) Date: Oct. 1, 2019

(87) PCT Pub. No.: WO2018/041287
PCT Pub. Date: Mar. 8, 2018

(65) Prior Publication Data
US 2020/0017417 A1 Jan. 16, 2020

(30) Foreign Application Priority Data

Sep. 2, 2016 (DE) .................. 10 2016 010 586.0

(51) Int. Cl.
*C01D 3/22* (2006.01)
*C05G 3/20* (2020.01)
(Continued)

(52) U.S. Cl.
CPC ............... *C01D 3/22* (2013.01); *C01D 3/04* (2013.01); *C01D 3/26* (2013.01); *C05D 1/005* (2013.01); *C05G 3/20* (2020.02); *C05G 5/12* (2020.02)

(58) Field of Classification Search
CPC ... C01D 3/22; C01D 3/26; C01D 3/04; C05G 3/20; C05D 1/0005
(Continued)

(56) References Cited

U.S. PATENT DOCUMENTS 3,197,302 A 7/1965 MacBride
4,093,710 A * 6/1978 Sass ..................... A61K 9/0007
424/44

(Continued)

FOREIGN PATENT DOCUMENTS

DE  27 48 220 A1  6/1978

OTHER PUBLICATIONS

Nokhodchi, "An Overview of the Effect of Moisture on Compaction and Compression", Pharmaceutical Technology, Jan. 2005, pp. 46-66, taken from https://cdn.sanity.io/files/0vv8moc6/pharmtech/5d20b3ca469c920681cd9a98eb0756b170b7066f.pdf/article—141826.pdf (Year: 2005).*

(Continued)

*Primary Examiner* — James E McDonough
(74) *Attorney, Agent, or Firm* — Oblon, McClelland, Maier & Neustadt, L.L.P.

(57) ABSTRACT

A method for producing potassium chloride granular materials from a crystalline potassium chloride raw material, wherein, before the granulation process, the potassium chloride raw material is treated with at least one alkali metal carbonate and at least one hydrogen phosphate additive in the presence of water. The alkali metal carbonate is anhy-
(Continued)

drous sodium carbonate, sodium carbonate monohydrate or sodium carbonate decahydrate.

20 Claims, 1 Drawing Sheet

(51) Int. Cl.
    *C01D 3/04*     (2006.01)
    *C01D 3/26*     (2006.01)
    *C05D 1/00*     (2006.01)
    *C05G 5/12*     (2020.01)

(58) Field of Classification Search
    USPC ........................................ 423/499.1
    See application file for complete search history.

(56) References Cited

U.S. PATENT DOCUMENTS

| | | | | |
|---|---|---|---|---|
| 4,385,920 A * | 5/1983 | Dancy | ................. | C01D 7/38 71/36 |
| 5,503,641 A * | 4/1996 | Bakardjiev | .......... | B01D 9/0013 23/302 R |
| 6,379,414 B1 * | 4/2002 | Kleine-Kleffmann | ... | C05D 1/02 71/61 |
| 8,685,135 B2 | 4/2014 | Phinney | | |
| 2005/0036929 A1 * | 2/2005 | Ferguson | ................. | C01D 3/22 423/274 |
| 2009/0175940 A1 * | 7/2009 | Gruber | ................. | A61K 9/1694 424/479 |
| 2010/0040882 A1 | 2/2010 | Phinney | | |
| 2011/0123420 A1 * | 5/2011 | Phinney | ................... | C01D 3/08 423/197 |
| 2012/0068084 A1 * | 3/2012 | Li | ............... | G01T 1/10 250/483.1 |
| 2013/0091915 A1 * | 4/2013 | Phinney | ................. | C05D 1/005 71/23 |
| 2014/0260467 A1 * | 9/2014 | Peacock | ................... | C05G 5/12 71/48 |
| 2018/0009950 A1 * | 1/2018 | Gramlich | ............ | B29C 71/0009 |

OTHER PUBLICATIONS

International Search Report dated Nov. 20, 2017 in PCT/DE2017/000259, 2 pages.

* cited by examiner

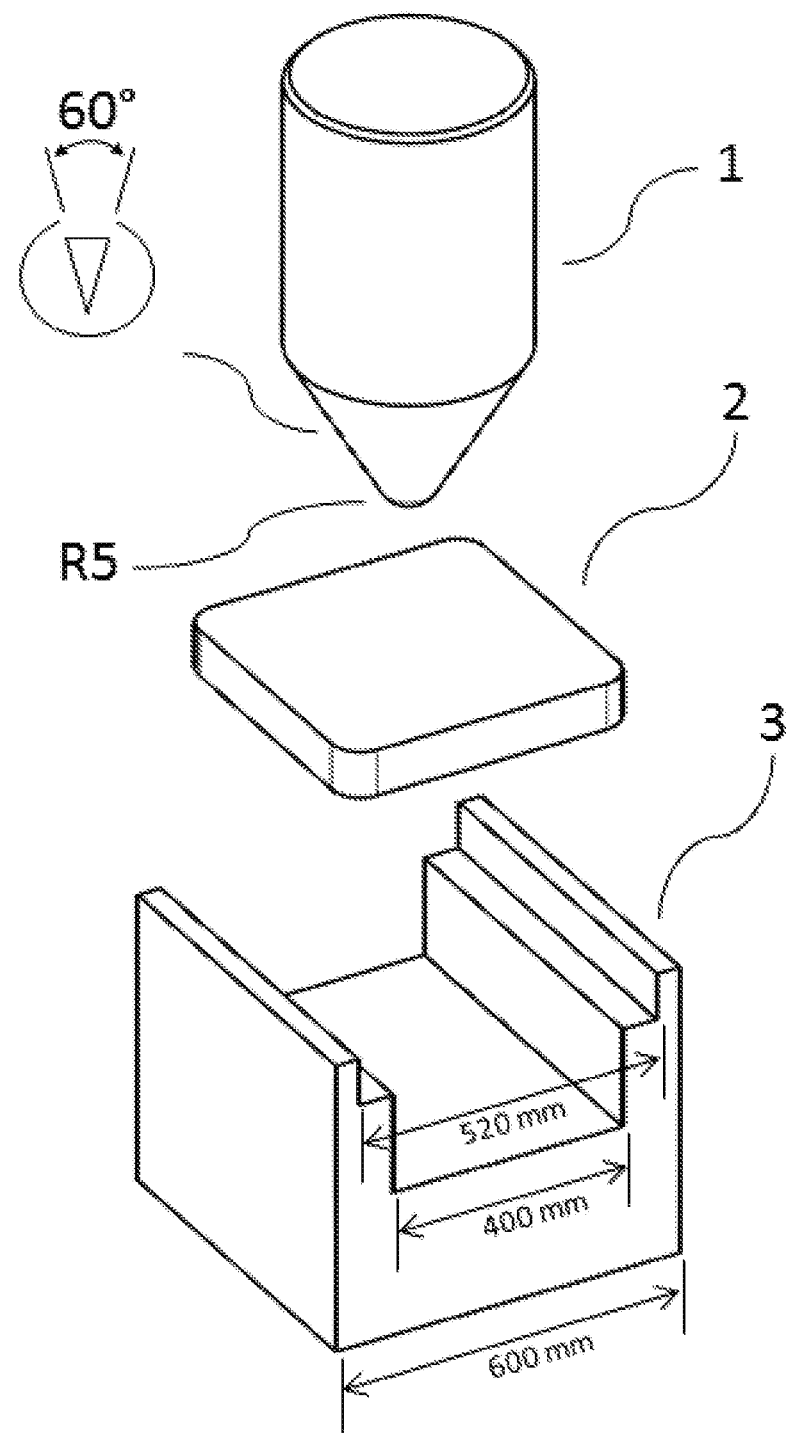

METHOD FOR PRODUCING POTASSIUM CHLORIDE GRANULAR MATERIAL

The present invention relates to a process for producing potassium chloride granules from a crystalline potassium chloride raw material, for example from a crystalline potassium chloride obtained by flotation, evaporation, crystallization, solar evaporation or by a hot leaching method. The invention also relates to the potassium chloride granules obtainable by the process.

Potassium chloride is an important constituent of agricultural fertilizers. Potassium chloride is typically obtained in underground mines by conventional mining, by solution mining or by solar evaporation of saltwater. The potassium chloride thus obtained is then processed further to give the desired use forms.

Potassium chloride is frequently marketed in the form of granules since these have advantageous handling properties. Thus, granules by comparison with finely divided crystalline potassium chloride have a very much lower tendency to form dust, are more storage-stable, have less of a tendency to caking, and can be deployed more easily and uniformly by scattering when employed as fertilizer. The quality of the potassium chloride granules and hence the price attainable on the market depend both on the purity and on the granule quality.

The crystalline potassium chloride raw material obtained in the mining of potassium chloride typically has particle sizes well below the desired granule size. For production of the granules, the potassium chloride raw materials are subjected to a standard granulation method in which the finely divided crystalline potassium chloride particles of the raw material are combined (agglomerated) with increasing particle size.

Customary granulation methods for the production of potassium chloride granules are compression agglomeration and buildup agglomeration. In the buildup agglomeration of potassium chloride, the finely divided starting material is subjected to vigorous motion with addition of an aqueous liquid, resulting in numerous collisions between the primary particles, which then combine to form aggregates owing to the capillary forces imparted by the liquid. These aggregates can then combine with one another or with further primary particles. The constant motion leads to continual buildup of particle layers and to densification of the particles, such that what is ultimately obtained are moist granules (green granules) of the desired size, which are then dried and hardened to give the finished granules. In the compression agglomeration of potassium chloride, the finely divided starting material is compressed by application of pressure, and so forces that are sometimes very high act on the primary particles. This results in deformation of the primary particles in the contact region, for example through plastic deformation, and the deformation considerably increases the adhesion of the primary particles to one another. As a result of heat of friction, sintering processes can also occur locally, and so solid bridges form between the primary particles.

The actual agglomeration, optionally after the drying of the moist granules, is followed by classification of the granules obtained as the primary product, in which the primary granules are separated into fractions of the desired particle size.

Potassium chloride granules are generally mechanically unstable. Under the action of mechanical forces as occur in the course of handling, in the course of storage or especially also in the course of transport, the granule particles are damaged. This leads firstly to a decrease in the particle diameter of the granule particles and an associated reduction in value, and secondly to not inconsiderable formation of fine particles. These fine particles can lead to problems in the storage and handling of the granules, in that they form dust, for example, or cause caking of the granule particles when moist.

To improve the mechanical stability of the granules, binders are frequently used in the aforementioned granulation methods, and these improve the bonding forces between the particles and hence integrity of the particles in the granules. Typical binders are gelatin, starch, molasses, lignosulfonates, lime and clay minerals. The choice of binder will generally have a crucial influence on the properties of the granules, especially their mechanical strength (abrasion, hardness), their hygroscopic properties and their tendency to form dust. However, potassium chloride granules typically have only inadequate mechanical stability even when such conventional binders are used, and so the abovementioned problems occur.

SU 990755 describes a process for producing potassium chloride granules by a compression agglomeration method, in which sodium polyphosphate is added to the potassium chloride starting material in an amount of 0.2% to 1% by weight based on potassium chloride.

RU 2083536 describes a process for producing potassium chloride granules by compression agglomeration of potassium chloride raw material, in which the potassium chloride dust obtained in the compression agglomeration is admixed with an aqueous solution of sodium metasilicate and added to the potassium chloride raw material used for compaction.

U.S. Pat. No. 4,385,020 describes a process for producing potassium chloride granules, in which potassium chloride is processed with a phosphate binder in a drum granulator or pan granulator to give potassium chloride granules.

DE 10252848 describes a process for producing potash fertilizer granules, in which raw potash fertilizer granules are treated with a silicate- or carbonate-containing solution. Subsequently, the granules thus treated are treated with kinetic energy in the form of vibrations. To improve stability to air humidity, the granules thus obtained are coated with a water-repellent substance, for example with palmitin.

CA 2,465,461 describes a process for producing potassium chloride granules by a compression agglomeration method, in which hexasodium metaphosphate (SHMP). tetrasodium pyrophosphate or trisodium phosphate is added as binder to the potassium chloride prior to its compaction. The SHMP is intended to serve to bind the moisture and the magnesium and calcium salts present in the potassium chloride and hence to improve mechanical stability, especially on transport.

However, the mechanical properties of the potassium chloride granules known from the prior art are unsatisfactory in spite of these binders, especially when the potassium chloride granules are exposed to an atmosphere with elevated air humidity over a prolonged period of time. More particularly, the known potassium chloride granules, after storage at elevated air humidity, are notable for inadequate fracture resistance or cracking resistance and unsatisfactory abrasion.

It is thus an object of the present invention to provide potassium chloride granules having improved mechanical strength, especially high fracture resistance or cracking resistance and satisfactory abrasion values. More particularly, the potassium chloride granules, even after prolonged action of high air humidity, for example air humidity at 70% RH (relative humidity) or higher, or other action of moisture as a result of weathering, should still show satisfactory or good mechanical properties; in other words, fracture resistances or cracking resistances should be high even in the case of high air humidity and moisture absorption should be low.

It has been found that, surprisingly, these objects are achieved by treating a crystalline potassium chloride raw material in the presence of water, for example in the form of a filter-moist fine salt, prior to the granulation, with at least one alkali metal carbonate and at least one hydrogenphosphate additive. The combination of at least one alkali metal carbonate and at least one hydrogenphosphate additive distinctly increases fracture resistance at relatively high air humidities of, for example, 70% RH or higher and reduces the moisture absorption of the potassium chloride granules.

Accordingly, the present invention relates to a process for producing potassium chloride granules from a crystalline potassium chloride raw material, in which the potassium chloride raw material, prior to the granulation, is treated with at least one alkali metal carbonate and at least one hydrogenphosphate additive in the presence of water.

Preferred configurations of the process of the invention are described in the subsidiary claims and hereinafter.

The potassium chloride granules obtainable in accordance with the invention, by comparison with potassium chloride granules composed of an untreated crystalline potassium chloride raw material and likewise by comparison with potassium chloride granules composed of a potassium chloride raw material that has been treated prior to the granulation only with one additive, i.e. either with the alkali metal carbonate or with the hydrogenphosphate additive, are notable for higher mechanical strength, especially for higher fracture resistance or cracking resistance. The granules additionally feature low abrasion. The advantageous mechanical strength is manifested especially when the potassium chloride granules are exposed to moisture as a result of weathering, for example an atmosphere with elevated air humidity, especially an air humidity of 70% RH or higher. This is surprising particularly because treatment with alkali metal carbonate alone does not lead to any significant improvement in the fracture resistance or cracking resistance values of weathered granules.

Accordingly, the present invention also relates to the potassium chloride granules obtainable by the process of the invention.

The invention also relates to the use of a combination of at least one alkali metal carbonate, at least one hydrogenphosphate additive and water for increasing the fracture/cracking resistance and for reducing the moisture absorption of potassium chloride granules.

The present invention further relates to the use of a combination of at least one alkali metal carbonate, at least one hydrogenphosphate additive and water for increasing the fracture resistance or cracking resistance of potassium chloride granules that are subjected to high air humidity, especially an air humidity of not less than 70% RH.

In the process according to the invention, a crystalline potassium chloride raw material is used as starting material. This crystalline potassium chloride raw material is also referred to hereinafter as fine salt. The crystalline potassium chloride raw material consists essentially, i.e. generally to an extent of at least 90% by weight, frequently to an extent of at least 95% by weight, particularly to an extent of at least 98% by weight and especially to an extent of at least 99% by weight or to an extent of at least 99.5% by weight, based on the solid constituents of the potassium chloride raw material, of potassium chloride. The potassium content of the crystalline potassium chloride raw material, calculated as $K_2O$, is typically at least 56.9% by weight, frequently at least 60.0% by weight, particularly at least 61.9% by weight and especially at least 62.5% by weight, based on the solid constituents of the potassium chloride raw material.

The potassium chloride raw material contains the impurities typical of its origin, especially sodium salts and alkaline earth metal salts, in particular magnesium salts and/or calcium salts. It can be assumed that these impurities, especially the magnesium salts and calcium salts, lead to the observed stability problems with the granules, especially when the granules are exposed to high air humidity. Frequently, the potassium chloride raw material used contains alkaline earth metal salts, e.g. calcium salts and/or magnesium salts, in a total amount of 0.01% to 1.0% by weight, especially 0.05% to 0.7% by weight, respectively calculated as alkaline earth metal chloride, for example as $MgCl_2$ and $CaCl_2$, and based on the potassium chloride (KCl) present in the raw material.

The potassium chloride raw material used for production of the granules is typically a crystalline potassium chloride obtained by mining or via solar evaporation or solution mining, which has been processed, for example, by flotation, by evaporation, crystallization and/or by a hot leaching method or by a combination of these measures. In the process of the invention, it is additionally also possible to mix further potassium chloride into the potassium chloride raw material. This is, for example, reject material obtained in the classification of the potassium chloride granules of the invention, which has optionally been comminuted. In these mixtures of potassium chloride raw material and further potassium chloride, the proportion of further potassium chloride, for example the reject material, will generally be in the range from 1% to 70% by weight, based on the total mass of the amount introduced for granulation.

Rather than a freshly processed fine salt, it is also possible to use an already finished fine salt for granulation, for example a finished fine salt having a potassium content of at least 60% by weight, based on the dry constituents and calculated as $K_2O$.

In general, the potassium chloride raw material is in the form of fine crystalline salt particles. As well as the crystal particles, the potassium chloride raw material may also contain coarser particles, for example from the reject material. Typically, a potassium chloride raw material in which at least 90% by weight of the particles of the potassium chloride raw material have a particle size of not more than 2 mm is used. In particular, 90% by weight of the particles of the potassium chloride raw material have a particle size in the range from 0.01 to 2 mm.

According to the invention, the potassium chloride raw material, prior to the granulation, is treated with at least one hydrogenphosphate additive and at least one alkali metal carbonate in the presence of water. Alkali metal carbonate and hydrogenphosphate additive are also referred to hereinafter as additives.

The treatment of the potassium chloride raw material with alkali metal carbonate and hydrogenphosphate additive can be effected simultaneously or successively. In the case of simultaneous addition, the alkali metal carbonate and hydrogenphosphate additive can be added separately or as a preliminary mixture.

Examples of suitable alkali metal carbonates are sodium carbonate and potassium carbonate, which may be used in anhydrous form or in the form of their hydrates. More particularly, the alkali metal carbonate is selected from anhydrous sodium carbonate ($Na_2CO_3$), sodium carbonate monohydrate ($Na_2CO_3 \cdot H_2O$) and sodium carbonate decahydrate ($Na_2CO_3 \cdot 10\ H_2O$), and mixtures thereof. Particularly preferred alkali metal carbonate is anhydrous sodium carbonate.

Suitable hydrogenphosphate additives are those of the formula $M_{3-k}H_kPO_4$ in which k is 1 or 2 and M is an alkali metal cation, especially Na or K, and hydrates thereof. The sodium compounds are preferably sodium dihydrogenphosphate ($NaH_2PO_4$), and disodium dihydrogenphosphate ($Na_2HPO_4$) and hydrates thereof, for example anhydrous sodium dihydrogenphosphate, sodium dihydrogenphosphate monohydrate, sodium dihydrogenphosphate dihydrate, anhydrous disodium hydrogenphosphate, disodium hydrogenphosphate dihydrate, disodium hydrogenphosphate heptahydrate, and disodium hydrogenphosphate dodecahydrate, and mixtures thereof. A particularly preferred hydrogenphosphate additive is disodium hydrogenphosphate and especially anhydrous disodium hydrogenphosphate. Rather than the aforementioned sodium compounds, the use of hydrogenphosphate additives in which sodium ions have been fully or partly replaced by potassium is also possible.

In the process of the invention, the alkali metal carbonate is preferably used in an amount of at least 0.05% by weight, especially in an amount of at least 0.1% by weight, based on the solid constituents of the potassium chloride raw material. The amount of alkali metal carbonates required to achieve the desired effect will generally not exceed 1% by weight and especially 0.7% by weight, based on the solid constituents of the potassium chloride raw material. In particular, the alkali metal carbonate will be used in an amount of 0.05% to 1% by weight and especially in an amount of 0.1% to 0.7% by weight, based on the solid constituents of the potassium chloride raw material. More particularly, the amount of alkali metal carbonate used is guided by the alkaline earth metal salts present in the potassium chloride raw material. Preferably, the at least one alkali metal carbonate is used in an amount of 0.5 to 2 mol, especially in an amount of 0.8 to 1.5 mol, per mole of alkaline earth metal ions in the potassium chloride raw material.

In the process of the invention, the hydrogenphosphate additive is preferably used in an amount of at least 0.025% by weight, especially in an amount of at least 0.05% by weight, based on the solid constituents of the potassium chloride raw material. The amount of hydrogenphosphate additive required to achieve the desired effect will generally not exceed 2% by weight, particularly 1.5% by weight and especially 1% by weight, based on the solid constituents of the potassium chloride raw material. Frequently, the hydrogenphosphate additive will be used in an amount of 0.025% to 2% by weight, particularly in an amount of 0.05% to 1.0% by weight and especially in an amount of 0.07% to 0.4% by weight, based on the solid constituents of the potassium chloride raw material. In particular, the amount of hydrogenphosphate additive used is guided by the content of alkaline earth metal salts present in the potassium chloride raw material. Preferably, the at least one hydrogenphosphate additive is used in an amount of 0.1 to 1 mol, especially in an amount of 0.3 to 0.7 mol, per mole of alkaline earth metal ions in the potassium chloride raw material.

It is essential that the treatment of the potassium chloride raw material with the alkali metal carbonate and the hydrogenphosphate additive is effected in the presence of water. This may be water that comes from the processing of the potassium chloride raw material, for example water adhering to or included in the potassium chloride particles, and/or the water of crystallization, and/or water that has been added to the potassium chloride raw material before or during the addition of alkali metal carbonate or hydrogenphosphate additive. The total water content in the potassium chloride raw material during the treatment with the alkali metal carbonate and the hydrogenphosphate additive is typically at least 2% by weight and especially at least 3% by weight, for example in the range from 2% to 15% by weight, especially in the range from 4% to 9% by weight, based in each case on the solid constituents of the potassium chloride raw material. If the total water content in the potassium chloride raw material prior to the treatment with the alkali metal carbonate and the hydrogenphosphate additive is less than 2% by weight, based on the solid constituents of the potassium chloride raw material, it will be increased, for example before or during the treatment, by addition of water, to a value of at least 2% by weight, based in each case on the solid constituents of the potassium chloride raw material.

The procedure will frequently be to use a moist potassium chloride raw material that already has the desired water content. Optionally, the water content of the potassium chloride raw material is adjusted to these values before or during the treatment with the alkali metal carbonate and the hydrogenphosphate additive.

In the treatment of the potassium chloride raw material, the at least one alkali metal carbonate and the at least one hydrogenphosphate additive can be added simultaneously or successively to the potassium chloride raw material. It is basically immaterial here whether first alkali metal carbonate and then hydrogenphosphate additive is added to the potassium chloride raw material or vice versa or whether alkali metal carbonate and hydrogenphosphate additive are added simultaneously to the potassium chloride raw material. What is essential is that the addition of alkali metal carbonate and hydrogenphosphate additive is effected prior to the granulation and in the presence of a sufficient amount of water. If the potassium chloride raw material is dried prior to the granulation, alkali metal carbonate and hydrogenphosphate additive and optionally water are typically added to the potassium chloride raw material prior to the drying.

Frequently, the procedure will be such that the alkali metal carbonate additives and hydrogenphosphate additive are added to the moist potassium chloride raw material and then the moist potassium chloride raw material thus treated, i.e. treated moist fine salt, is dried prior to the granulation, especially when the granulation is effected by compression granulation. In particular, the drying is effected down to a water content of not more than 1% by weight, based on the solid constituents in the potassium chloride raw material thus treated. Subsequently, the granulation is then conducted. The potassium chloride raw material thus treated and dried can also be stored prior to the granulation.

For treatment of the potassium chloride raw material with the at least one alkali metal carbonate, the alkali metal carbonate will generally be used in the form of a powder and/or in the form of an aqueous solution. If the alkali metal carbonate is used in the form of a powder, the particle size of the powder will generally not exceed 1 mm and especially 0.5 mm. If the total water content of the potassium chloride raw material is insufficient, the addition of alkali metal carbonate as a solution is likewise possible.

For treatment of the potassium chloride raw material with the at least one hydrogenphosphate additive, the hydrogenphosphate additive will generally be used in the form of a powder and/or in the form of an aqueous solution. If the hydrogenphosphate additive is used in the form of a powder, the particle size of the powder will generally not exceed 1 mm and especially 0.5 mm. If the total water content of the potassium chloride raw material is insufficient, the addition of hydrogenphosphate additive as a solution is likewise possible.

For treatment of the potassium chloride raw material with the alkali metal carbonate and the hydrogenphosphate additive, the alkali metal carbonate or hydrogenphosphate additive will typically be mixed with the potassium chloride raw material in the desired amount. As already stated above, this mixing must precede the granulation. The total water content in the moist potassium chloride raw material during the addition of the alkali metal carbonate additive and hydrogenphosphate additive should generally be in the range from 2% to 15% by weight and especially in the range from 4% to 9% by weight, based in each case on the solid constituents of the potassium chloride raw material, or should be adjusted to these values. In particular, the alkali metal carbonate will be added to the moist potassium chloride raw material (i.e. the moist fine salt) prior to the drying. In a specific embodiment, both the alkali metal carbonate and the hydrogenphosphate additive will be added to the moist potassium chloride raw material (i.e. the moist fine salt) in the desired amount prior to the drying.

In addition, the process of the invention can also be used to produce potassium chloride granules that additionally contain micronutrients such as B, Mn, Mo, Cu, Zn and Fe or mixtures thereof. The micronutrients may be added before, during or after the granulation. For example, it is possible to use a potassium chloride raw material that already contains the desired amount of micronutrients. Frequently, however, the micronutrients will be added during the process of the invention, for example during the addition of the additives or thereafter, and then the potassium chloride raw material thus obtained will be granulated. It is also possible for the micronutrients to be added to the finished granules, for example by spraying an aqueous solution of the micronutrients onto the granules. The amount of micronutrients will generally not exceed 1% by weight, based on the dry potassium chloride granules and calculated in each case as the element. For example, the potassium chloride granules obtainable in accordance with the invention may contain 0.001% to 1% by weight of B.

The actual procedure for the granulation may be in analogy to the agglomeration methods known from the prior art that are described, for example, in Wolfgang Pietsch, Agglomeration Processes, Wiley-VCH, 1st edition, 2002 and in G. Heinze, Handbuch der Agglomerationstechnik [Handbook of Agglomeration Technology], Wiley-VCH. 2000. and in Perry's Chemical Engineers' Handbook, 7th edition, McGraw-Hill, 1997.

In general, the granulation is effected as a compression agglomeration or else buildup agglomeration.

In a granulation by means of buildup agglomeration, the treated potassium chloride raw material containing the alkali metal carbonate additive and hydrogenphosphate additive in the desired amounts is set in motion by the action of mechanical forces and optionally treated with water or aqueous solutions of alkali metal carbonate and hydrogenphosphate additive during the granulating operation. The buildup agglomeration can be effected here in a manner known per se as a rolling agglomeration, mixing agglomeration or fluidized bed agglomeration, especially as a rolling agglomeration. In rolling agglomeration, the potassium chloride raw material that optionally already contains the alkali metal carbonate additive and hydrogenphosphate additive constituents will be introduced into a vessel with an inclined axis of rotation and circular cross section, preferably into a granulating drum or onto a granulating pan. By rotating the vessel, the particles of the fine salt are set in motion. The treatment with the water or the aqueous solutions of alkali metal carbonate and hydrogenphosphate additive is effected, for example, by spraying onto the potassium chloride raw material that has been set in motion. This affords comparatively uniform, round granules that can be sent directly to a classification.

Preferably, the granulation comprises a compression agglomeration of the treated potassium chloride raw material and a comminution of the material obtained in the compression agglomeration. In compression agglomeration, the treated potassium chloride raw material is compacted under pressure. Suitable presses for compaction are in principle all those known for similar purposes, for example die presses, strand presses, hole presses and roll presses.

Preferably, the compaction is effected using a roll press. In roll pressing, the compaction is effected in the gap between two rolls rotating counter to one another. The roll surfaces may be smooth, profiled, for example striated, corrugated or waffled, or equipped with molding wells. Any profiling of the roll surface serves in particular to improve the intake ratio into the roll gap. Frequently, roll presses with a smooth or profiled roll surface will be used. In this case, the primary agglomeration product is a strand in the form of a ribbon that emerges from the roll gap, which is also referred to as slug.

The compression forces required for the compaction, which are typically based on the roll width and reported as linear forces, are generally in the range from 1 to 75 kN/cm, especially in the range from 40 to 70 kN/cm, and based on diameter 1000 mm and an average slug thickness of 10 mm. In general, the roll press is operated at a circumferential roll speed in the range from 0.2 to 1.6 m/s. Typically, the compaction is effected at temperatures in the range from 80 to 100° C. or at the temperature established owing to the action of the mechanical forces on the treated potassium chloride raw material (i.e. the treated fine salt). Optionally, the material supplied to the granulation will be preheated to the temperature desired for the compaction or still has residual heat, for example from the drying.

Optionally, the compression agglomeration can be performed in multiple stages.

The compression agglomeration of the treated potassium chloride raw material with a roll press generally affords slugs that are subjected to a comminution to adjust the particle size of the granules obtained. The slugs can be comminuted in a manner known per se, for example by grinding in devices suitable for the purpose, for example in impact crushers, impact mills or roll crushers.

In general, the actual granulating operation is followed by a classification of the granules. A separation of the granules is effected here into granules having the on-spec particle size, smaller granules (fines) and optionally coarser granules (oversize). On-spec potassium chloride granules are especially those in which at least 90% by weight of the granule particles have a particle size or particle diameter in the range from 0.5 to 8 mm and especially in the range from 2 to 4 mm. The classification can be effected by customary methods, especially by sieving.

The off-spec granule material obtained in the classification, called the reject material, will generally be recycled into the process.

In a preferred embodiment of the invention, a moist potassium chloride raw material generally containing 2% to 15% by weight, especially 4% to 9% by weight, based on the solid constituents of the potassium chloride raw material will be mixed with the at least one alkali metal carbonate, especially with anhydrous sodium carbonate, and the at least one hydrogenphosphate additive, especially with disodium hydrogenphosphate, in the desired amount, giving a treated (conditioned) moist potassium chloride raw material. It is possible here to use alkali metal carbonate and disodium hydrogenphosphate in the form of solids or in the form of aqueous solutions. The conditioned potassium chloride raw material thus obtained is subsequently dried. The dry, conditioned potassium chloride raw material is sent, optionally together with the reject material, to a compression agglomeration, especially a compression agglomeration using a roll press with smooth or profiled rolls. The granules obtained here, i.e. the slugs, are subsequently comminuted and classified. The fines obtained in the classification are sent to the compression agglomeration together with the dried, conditioned potassium chloride raw material.

The granules thus obtained can be finished, for example packaged and transported, in a manner known per se.

The potassium chloride granules obtainable by the process of the invention naturally contain, as well as potassium chloride, the alkali metal carbonate additive and hydrogenphosphate additive (or conversion products thereof) in the amount used in the process of the invention. More particularly, the potassium chloride granules obtainable in accordance with the invention consist to an extent of at least 90% by weight, particularly at least 95% by weight and especially at least 98% by weight, based on anhydrous granules, of:
i) potassium chloride,
ii) the alkali metal carbonate additive and/or reaction products thereof, such as $MgCO_3$ or $CaCO_3$, in an amount of 0.05% to 1% by weight, especially in an amount of 0.1% to 0.7% by weight, based on the potassium chloride present in the granules and calculated as alkali metal carbonate, and
iii) the hydrogenphosphate additive or its hydrolysis/conversion products, in an amount of 0.025% to 2% by weight, especially in an amount of 0.05% to 1.5% by weight, based on potassium chloride and calculated as hydrogenphosphate additive.

In addition, the potassium chloride granules obtainable in accordance with the invention contain the impurities present in the potassium chloride raw material/fine salt, for example magnesium salts and/or calcium salts, in the ratios stated above.

In addition, the potassium chloride granules may also contain micronutrients such as B, Mn, Mo, Cu, Zn and Fe or mixtures thereof. The amount of micronutrients will generally not exceed 1% by weight, based on the anhydrous potassium chloride granules and calculated in each case as the element. For example, the potassium chloride granules obtainable in accordance with the invention may contain 0.001% to 1% by weight of boron.

As already mentioned, the potassium chloride granules of the invention are notable for high mechanical stability even when stored in a moist atmosphere, for example at relative humidities/air humidities of 70% RH or above 70% RH. Even under these conditions, the potassium chloride granules of the invention show only minor dusting characteristics and a high fracture/cracking resistance, low moisture absorption and low abrasion.

FIG. 1 shows an experimental setup for determination of "fracture resistance" for test specimens, comprising a test ram (1) having a conical test tip (R5) and a u-shaped test specimen holder (3) in which the test specimen (2) is fixed on both sides.

LABORATORY EXPERIMENTS

The potassium chloride raw material (fine salt) used was a crystalline material obtained by hot leaching. The potassium content of the potassium chloride was around 60% by weight, calculated as $K_2O$ and based on solid constituents. The Mg content, calculated as $MgCl_2$, and the Ca content, calculated as $CaCl_2$, totaled around 0.13% by weight, based on solid constituents. The grain size of the potassium chloride raw material (fine salt) was generally 0.01 to 2 mm. The water content of the moist potassium chloride raw material (moist fine salt) was 4-9% by weight, especially 8% by weight, based on the solid constituents prior to the drying.

The alkali metal carbonate and hydrogenphosphate additive used in each case were a commercial pulverulent anhydrous sodium carbonate and disodium hydrogenphosphate with a water content of 0.01% by weight.

Production of test specimens for the determination of fracture resistance:

For this purpose, 3 kg of the potassium chloride of the above-stated specification, with addition of 240 g of water, were mixed with the respective additive in powder form in an intensive mixer for 1 min. The moist potassium chloride raw material/additive mixture was dried in a drying cabinet at 105° C. for 24 h and then deagglomerated with a disk mill to a grain size of <0.8 mm. For the "dry" comparative experiments, the additives were mixed together after the drying and after the deagglomeration.

For the determination of fracture resistance, this material was used to produce cuboidal test specimens of dimensions 50×50×8 mm. The production of the test specimens (laboratory experiments) was effected by means of a hydraulic ram press (K50 model from Komage) at a compression force of about 290 kN, as shown in schematic form in FIG. 1.

Determination of Fracture Resistance (Point Load) of the Test Specimens:

The unweathered test specimens were analyzed immediately after they had been produced. For weathering, the freshly produced test specimens were weighed and then weathered as follows: The test specimens were fixed vertically in sample holders and stored in a climate-controlled cabinet at 20° C. and 70% relative air humidity for 72 h.

Immediately after they had been removed from the climate-controlled cabinet, the test specimens thus weathered were weighed again to determine water/moisture absorption and then fracture resistance was determined immediately.

The determination of fracture resistance via a point load was in accordance with ASTM D5731:2008 (Point load strength index). For this purpose, the square test specimens (2) were fixed at both sides in the u-shaped sample holder (3) of the tester shown schematically in FIG. 1 in such a way that the test tip (R5) was directed to the middle of the square test specimen (2). Then the test tip was pressed onto the test specimen at a speed of 1 mm/min and the force exerted on the test specimen was determined by means of a load cell. The maximum stress value on the test specimen immediately prior to the fracture of the test specimen is ascertained, which is indicated by a drop in the force to zero. The test tip was conical with a cone angle of 60°. The tip has a radius of 5 mm (cf. FIG. 1).

10 test specimens (weathered/unweathered) were measured in each case. The values for the compressive strengths (point load) reported in table 1 are averages from 10 measurements.

TABLE 1

Fracture resistances of test specimens made from potassium chloride raw material and the additives anhydrous sodium carbonate and anhydrous disodium hydrogenphosphate or anhydrous sodium dihydrogenphosphate, laboratory experiments (square test specimens):

| # | Additives | Point loads- unweathered | Point loads- weathered** | Moisture absorption at 70% RH** |
|---|---|---|---|---|
| 1* | 0.16% by wt. A11 + 0.28% by wt. P954 | 0.37 kN | 0.32 kN | 0.08% |
| 2* | 0.16% by wt. A11 + 0.14% by wt. P954 | 0.36 kN | 0.26 kN | 0.13% |
| 3* | 0.16% by wt. A11 + 0.07% by wt. P954 | 0.35 kN | 0.23 kN | 0.26% |
| 4* | 0.16% by wt. A11 + 0.04% by wt. P954 | 0.34 kN | 0.21 kN | 0.23% |
| V5* | 0.28% by wt. P954 | 0.37 kN | 0.28 kN | 0.24% |
| V6* | 0.14% by wt. P954 | 0.33 kN | 0.22 kN | 0.49% |
| V7* | 0.07% by wt. P954 | 0.30 kN | 0.21 kN | 0.63% |
| V8* | 0.04% by wt. P954 | 0.33 kN | 0.20 kN | 0.72% |
| V9 | 0.28% by wt. P954 dry | 0.32 kN | 0.20 kN | 0.25% |
| V10* | 0.13% by wt. A11 | 0.33 kN | 0.19 kN | 0.41% |
| V11 | 0.16% by wt. A11 (dry) | 0.33 kN | 0.15 kN | 0.68% |
| V12 | 0.16% by wt. A11 (dry) + 0.28% by wt. P954 (dry) | 0.34 kN | 0.19 kN | 0.24% |
| V13* | KCl raw material without additive | 0.34 kN | 0.17 kN | 0.63% |
| 14* | 0.08% by wt. A11 + 0.28% by wt. P954 | 0.35 kN | 0.31 kN | 0.13% |
| 15* | 0.32% by wt. A11 + 0.24% by wt. P951 | 0.38 kN | 0.32 kN | 0.11% |

*each with 8% by weight of water;
**weathered 72 h, 20° C., 70% RH;
# = experiment number;
V = comparative experiment;
A11 = anhydrous sodium carbonate;
P954 = anhydrous disodium hydrogenphosphate;
P951 = anhydrous sodium dihydrogenphosphate
60er MOP fein = fine potassium chloride salt with a potassium content of at least 60.0% $K_2O$ Factory Operation Experiment:

For production of potassium chloride granules for the factory operation experiments, moist potassium chloride raw material (i.e. moist fine salt) having a residual moisture content of 2-15% by weight was sent to the drying stage, optionally via a mixer. The additives of the invention were added, for example, in the installed mixer and the mixture was homogenized. The treated fine salt was then sent to the drying stage and subsequently introduced into the presses, optionally together with the compression reject material in the granulation. After classification/comminution, the material of the correct size is obtained, the saleable potassium chloride granules. One name given to these granules, provided that the potassium chloride content is at least 60.0% $K_2O$, is commercial "60er MOP-Gran".

For the compression agglomeration, in production, multiple roll presses with reject material circulation were used. The individual roll presses are constructed as follows: two rolls rotating counter to one another have waffle profiling on the roll surface (typical roll diameter 1000 mm, typical working width 1000 mm, gap width typically about 15 mm). The press was run with a linear force of around 60 kN/cm and a roll speed of 18 rpm. The fine salt was generally fed in by means of a central chain conveyor and the stuffing screws arranged above the presses.

The slugs obtained in the roll press were comminuted by means of an impact mill. Subsequently, the material was classified with a conventional sieving apparatus, the fraction with grain size 2-4 mm (product) was separated off, the fraction with grain size <2 mm was recycled to the feed (fines), and the fraction with grain size >4 mm (oversize) was ground up and sieved again.

For the determination of the cracking resistance of the granules, a test fraction (test granules) with a grain size of 2.5-3.15 mm was sieved out.

The unweathered test granules were analyzed parallel to the weathered granules.

For weathering, about 9 g of the test granules produced were introduced into a petri dish and weighed. For conditioning, the petri dish was stored in a climate-controlled cabinet at 20° C. and relative air humidity 70%, 72%, 73% or 74% for 24 h. Immediately after it had been removed from the climate-controlled cabinet, the petri dish containing test granules was weighed again to determine water absorption and then the fracture resistance of the granules was determined immediately by the method that follows.

The mean cracking resistances were ascertained with the aid of the TBH 425D tablet hardness tester from ERWEKA on the basis of measurements on 56 individual agglomerates of different particle size (2.5-3.15 mm fraction), and the average was calculated. The force required to break the granule between the ram and plate of the fracture resistance tester was determined. Granule particles having a cracking resistance >400 N and those having a cracking resistance <4 N were not included in the formation of the average.

In the factory operation experiment detailed in tab. 2, potassium chloride raw material having the following specification was used: KCl content around 61% $K_2O$, $MgCl_2$/$CaCl_2$ content about 0.2% by weight, the residual moisture contents of the (moist) potassium chloride raw material were generally 5.7-6.2% by weight. The amounts processed run to around 90 t/h potassium chloride raw material.

TABLE 2

Factory operation experiments: potassium chloride granules with anhydrous sodium carbonate and anhydrous disodium hydrogenphosphate made from filter-moist potassium chloride (KCl) raw material* with different weathering (cracking resistances in N and moisture absorption in %)

| # | Additives | un-weathered | 1 d/ 70% RH | 1 d/ 72% RH | 1 d/ 73% RH | 1 d/ 74% RH |
|---|---|---|---|---|---|---|
| 16* | 0.16% by wt. AA11 + 0.08% by wt. P954 | 83 N | 47 N 0.1% | 15 N 3.1% | <10 N 7.0% | |
| 17* | 0.16% by wt. A11 + 0.15% by wt. P954 | 73 N | 46 N 0.1% | 19 N 2.4% | 17 N 4.3% | 16 N 5.2% |
| V18* | 0.08% by wt. P954 | 61 N | 13 N 1.1% | <10 N 4.4% | | |

TABLE 2-continued

Factory operation experiments: potassium chloride granules with
anhydrous sodium carbonate and anhydrous disodium hydrogenphosphate
made from filter-moist potassium chloride (KCl) raw material* with different
weathering (cracking resistances in N and moisture absorption in %)

| # | Additives | un-weathered | 1 d/ 70% RH | 1 d/ 72% RH | 1 d/ 73% RH | 1 d/ 74% RH |
|---|---|---|---|---|---|---|
| V19* | 0.15% by wt. P954 | 85 N | 24 N 0.6% | <10 N 5.1% | | |
| V20* | 0.16% by wt. A11 | 85 N | 37 N 0.2% | <10 N 3.5% | | |
| V21* | KCl raw material (no additive) | 70 N | <10 2.1% | <10 7.3% | <10 12.0% | <10 14.5% |

# = experiment number;
1 d/70% RH = storage at 70% relative humidity for 1 day
1 d/72% RH = storage at 72% relative humidity for 1 day
1 d/73% RH = storage at 73% relative humidity for 1 day
1 d/74% RH = storage at 74% relative humidity for 1 day
*each with about 6% by weight of water;
A11 = anhydrous sodium carbonate;
P954 = anhydrous disodium hydrogenphosphate Table 2 shows the in comparison the particular effect of the combination of anhydrous sodium carbonate with disodium hydrogenphosphate compared to the individual additives. The products from experiments 16 and 17 show much higher cracking resistances—even in the case of higher relative air humidities—than the products from comparative experiments V18, V19, V20 and V21. Moisture absorption after one day is 0.1% or 0.1% (70% rel. humidity) and 3.1% or 2.4% (72% rel. humidity).

TABLE 3

Laboratory experiments with potassium chloride granules
with the additives anhydrous sodium carbonate and anhydrous
disodium hydrogenphosphate and micronutrients**

| | Additives | Point loads-unweathered | Point loads-weathered | Moisture absorption |
|---|---|---|---|---|
| 22* | 0.16% by wt. A11 + 0.28% by wt. P954 + 0.5% by wt. B | 0.34 kN | 0.42 kN | 0.19% |

*with 8% by weight of water;
**for comparative experiments see No. 1 and V12
A11 = anhydrous sodium carbonate;
P954 = anhydrous disodium hydrogenphosphate,
B = anhydrous borax, calculated as boron

The invention claimed is:

1. A process for producing potassium chloride granules from a crystalline potassium chloride raw material, the process comprising:
   treating the crystalline potassium chloride raw material, prior to granulating, with at least one alkali metal carbonate in an amount of from 0.05 to 0.7 wt. % and at least one alkali metal hydrogen phosphate in an amount of from 0.025 to 0.4 wt. % in the presence of water, the weight percentages based on solid constituents of the crystalline potassium chloride raw material, to obtain a treated potassium chloride material; and
   subsequently, granulating the treated potassium chloride material, the granulating comprising compression agglomeration,
   wherein the at least one alkali metal carbonate is at least one selected from the group consisting of a sodium carbonate, a potassium carbonate, and a mixture thereof, and
   wherein a counterion of the at least one alkali metal hydrogen phosphate is at least one selected from the group consisting of sodium and potassium, and
   wherein at least 90 wt. % of the potassium chloride granules have a particle size or particle diameter in a in a range of from 0.5 to 8 mm.

2. The process of claim 1, wherein the amount of the at least one alkali metal carbonate is in a range of from 0.1 to 0.7 wt. %.

3. The process of claim 1, wherein the amount of the at least one alkali metal hydrogen phosphate is in a range of from 0.07 to 0.4 wt. %.

4. The process of claim 1, wherein, during the treating, water is present in a range of from 2 to 15 wt. %, based on the solid constituents of the crystalline potassium chloride raw material.

5. The process of claim 1, wherein the at least one alkali metal carbonate is used in a form of a powder and/or in a form of an aqueous solution.

6. The process of claim 1, wherein the at least one alkali metal hydrogen phosphate is used in a form of a powder and/or in a form of an aqueous solution.

7. The process of claim 1, wherein the crystalline potassium chloride raw material comprises 0.01 to 1.0 wt % of magnesium salt(s), calcium salt(s), or mixture thereof, based in each case on KCl and calculated as $MgCl_2$ and $CaCl_2$ respectively.

8. The process of claim 1, further comprising:
   adding the at least one alkali metal carbonate to a moist potassium chloride raw material.

9. The process of claim 1, further comprising:
   adding the at least one alkali metal hydrogen phosphate to a moist potassium chloride raw material.

10. The process of claim 8, further comprising:
    drying the moist potassium chloride raw material, after the adding, prior to the granulating.

11. The process of claim 1, further comprising:
    adding at least one micronutrient to the crystalline potassium chloride raw material before or during the granulating.

12. Potassium chloride granules, obtained by the process of claim 1.

13. A method for reducing moisture absorption and/or increasing fracture resistance or cracking resistance of potassium chloride granules exposed to high air humidity, the method comprising:

bringing a combination of at least one alkali metal carbonate in an amount of from 0.05 to 0.7 wt. % at least one alkali metal hydrogen phosphate in an amount of from 0.025 to 0.4 wt. %, and water into contact with a crystalline potassium chloride raw material, the weight percentages based on solid constituents of the crystalline potassium chloride raw material, to obtain a treated potassium chloride material; and subsequently, granulating the treated potassium chloride material, the granulating comprising compression agglomeration, to form the potassium chloride granules, wherein the potassium chloride granules, when having a grain size in a range of from 2.5 to 3.15 mm have a reduced moisture absorption, based on mass measurement after 24 hours at 20° C. under relative humidity in a range of from 70 to 74%, and/or an increased fracture resistance or cracking resistance, based on mean cracking resistance measured with an ERWEKA® TBH 425D tablet hardness tester on 56 individual agglomerates of different particle size in a 2.5 to 3.15 mm fraction, relative to otherwise identically made potassium chloride granules; using only one of the alkali metal carbonate and the alkali metal hydrogen phosphate in an identical mass to a total mass of the alkali metal carbonate and the alkali metal hydrogen phosphate, and wherein the at least one alkali metal carbonate is at least one selected from the group consisting of a sodium carbonate, a potassium carbonate, and a mixture thereof, and wherein a counterion of the at least one alkali metal hydrogen phosphate is at least one of sodium and potassium.

14. The method of claim 13, which increases the fracture resistance or cracking resistance of the potassium chloride granules.

15. The process of claim 9, further comprising:
drying the moist potassium chloride raw material, after the adding, prior to the granulating.

16. The method of claim 13, which reduces the moisture absorption of the potassium chloride granules and increases the fracture resistance or cracking resistance of the potassium chloride granules.

17. The method of claim 13, wherein, during the treating, water is present in a range of from 2 to 15 wt. %, based on the solid constituents of the crystalline potassium chloride raw material.

18. The method of claim 16, wherein, during the treating, water is present in a range of from 4 to 9 wt. %, based on the solid constituents of the crystalline potassium chloride raw material.

19. The method of claim 1, wherein, during the treating, water is in a range of from 4 to 9 wt. %, based on the solid constituents of the potassium chloride raw material.

20. The method of claim 13, wherein, during the treating, water is in a range of from 4 to 9 wt %, based on the solid constituents of the potassium chloride raw material.

* * * * *